US012448836B2

(12) United States Patent
Queralt Monso et al.

(10) Patent No.: US 12,448,836 B2
(45) Date of Patent: Oct. 21, 2025

(54) DEVICE FOR ROLLING AND UNROLLING ROLL-UP BLINDS AND SIMILAR

(71) Applicants: Marc Queralt Monso, Barcelona (ES); Alberto Alemany Monso, Barcelona (ES); Alberto Alemany Barros, Barcelona (ES)

(72) Inventors: Marc Queralt Monso, Barcelona (ES); Alberto Alemany Monso, Barcelona (ES); Alberto Alemany Barros, Barcelona (ES)

( * ) Notice: Subject to any disclaimer, the term of this patent is extended or adjusted under 35 U.S.C. 154(b) by 0 days.

(21) Appl. No.: 17/985,290

(22) Filed: Nov. 11, 2022

(65) Prior Publication Data

US 2023/0075977 A1 Mar. 9, 2023

Related U.S. Application Data

(63) Continuation-in-part of application No. PCT/ES2021/070332, filed on May 11, 2021.

(30) Foreign Application Priority Data

May 11, 2020 (ES) ............................ ES202030854U

(51) Int. Cl.
*E06B 9/322* (2006.01)

(52) U.S. Cl.
CPC ...... *E06B 9/322* (2013.01); *E06B 2009/3225* (2013.01)

(58) Field of Classification Search
CPC ... E06B 9/26; E06B 9/262; E06B 9/34; E06B 9/40; E06B 9/64; E06B 9/322;
(Continued)

(56) References Cited

U.S. PATENT DOCUMENTS 110,939 A * 1/1871 Tambling .................. E06B 9/64 160/243
112,876 A * 3/1871 Williams .................. E06B 9/64 160/243
(Continued)

FOREIGN PATENT DOCUMENTS

ES 3202599 A1 6/1966
ES 2378068 T3 4/2012
ES 1143190 U * 9/2015

OTHER PUBLICATIONS

Int'l Search Report for PCT/ES2021/070332, dated Jul. 8, 2021.

*Primary Examiner* — Johnnie A. Shablack
(74) *Attorney, Agent, or Firm* — MaxGoLaw PLLC

(57) ABSTRACT

A device for winding and unwinding Alicantina shutters (12) and the like, which are raised by being wound onto themselves by means of at least a first cord (3) connected to a first elastic element (10) which is attached at one end to the head (1) of the shutter and at the other end to the end of the cord (3) which allows the unwound segment of the shutter (12) to be kept in a stretched position. The device includes at least a second cord (3') related to a second elastic element or spring (10') located at another point of the width of the shutter such that the elastic elements (10, 10') are retracted onto themselves during the process of unwinding the shutter due to the instantaneous tension difference supported by each of the elastic elements (10, 10'). The shutter (12) can be motorized.

2 Claims, 4 Drawing Sheets

(58) Field of Classification Search
CPC ..... E06B 2009/2622; E06B 2009/3225; E06B 2009/3222
USPC .................................................. 160/133, 243
See application file for complete search history.

(56) References Cited

U.S. PATENT DOCUMENTS

| | | | | | | |
|---|---|---|---|---|---|---|
| 201,553 | A | * | 3/1878 | Paling | F16G 11/00 | 160/396 |
| 626,475 | A | * | 6/1899 | Andrews | E06B 9/64 | 160/264 |
| 1,181,120 | A | * | 5/1916 | Douthitt | E06B 9/64 | 160/243 |
| 1,225,060 | A | * | 5/1917 | Russell | E06B 9/64 | 160/133 |
| 1,261,855 | A | * | 4/1918 | Rishel | E06B 9/64 | 160/DIG. 1 |
| 1,847,077 | A | * | 3/1932 | Boeck | E06B 9/34 | 160/133 |
| 2,056,154 | A | * | 10/1936 | Benson | E06B 9/324 | 160/133 |
| 2,420,301 | A | * | 5/1947 | Cusumano | E06B 9/305 | 160/192 |
| 2,596,714 | A | * | 5/1952 | Nonell | E06B 9/34 | 160/133 |
| 2,631,661 | A | * | 3/1953 | Nelson | E06B 9/302 | 160/133 |
| 2,808,222 | A | * | 10/1957 | Wassyng | E06B 9/24 | 160/19 |
| 3,280,890 | A | | 10/1966 | Preziosi | | |
| 4,603,725 | A | * | 8/1986 | Knight | E06B 9/64 | 160/133 |
| 5,133,399 | A | | 7/1992 | Hiller et al. | | |
| 6,367,537 | B1 | * | 4/2002 | Hsu | E06B 9/386 | 160/243 |
| 6,644,373 | B2 | * | 11/2003 | Palmer | E06B 9/322 | 160/192 |
| 6,725,897 | B2 | * | 4/2004 | Palmer | E06B 9/322 | 160/84.01 |
| 6,860,312 | B2 | * | 3/2005 | Judkins | E06B 9/386 | 160/133 |
| 7,028,742 | B2 | * | 4/2006 | Sears | E06B 9/64 | 160/310 |
| 7,128,121 | B2 | * | 10/2006 | Nien | E06B 9/262 | 160/85 |
| 7,216,687 | B2 | | 5/2007 | Franssen | | |
| 8,132,610 | B2 | * | 3/2012 | Lin | E06B 9/40 | 24/115 F |
| 9,243,446 | B2 | * | 1/2016 | Weiss | E06B 9/24 | |
| 10,151,142 | B2 | * | 12/2018 | Lin | E06B 9/66 | |
| 10,577,861 | B2 | * | 3/2020 | LeBlanc | E06B 9/84 | |
| 2002/0033241 | A1 | * | 3/2002 | Palmer | E06B 9/322 | 160/192 |
| 2003/0085002 | A1 | * | 5/2003 | Palmer | E06B 9/322 | 160/168.1 R |
| 2007/0089838 | A1 | | 4/2007 | Wetsema | | |
| 2007/0163728 | A1 | * | 7/2007 | Nien | E06B 9/388 | 160/178.1 R |
| 2007/0169898 | A1 | | 7/2007 | Lin | | |
| 2008/0099165 | A1 | * | 5/2008 | Birch | E06B 9/326 | 160/243 |
| 2013/0032300 | A1 | | 2/2013 | Yu et al. | | |
| 2016/0208551 | A1 | | 7/2016 | Huang et al. | | |
| 2016/0376839 | A1 | * | 12/2016 | Huang | E06B 9/323 | 160/368.1 |
| 2023/0075977 | A1 | * | 3/2023 | Queralt Monso | E06B 9/322 | |

* cited by examiner

DEVICE FOR ROLLING AND UNROLLING ROLL-UP BLINDS AND SIMILAR

RELATED APPLICATIONS

This application is a continuation-in-part of International Application No. PCT/ES2021/070332, filed 11 May 2021, which in turn claims priority benefit of Spanish Patent Application No. ES202030854U, filed 11 May 2020, the contents of the aforementioned priority documents are hereby incorporated by reference.

TECHNICAL FIELD

The present invention relates to a device for winding and unwinding Alicantina (chain) shutters and the like, the raising and lowering of which is carried out by means of manual or automatic actuation of at least one cord connected to the same shutter.

The object of the invention is to provide a device which allows raising of the shutters that prevents a poor winding of the shutter which is an operating problem that can lead to breakage of the device for winding and unwinding.

The invention focusses particularly on the means for winding and unwinding the cords for raising and lowering the cords of the shutter, all other elements involved in the shutter being conventional.

BACKGROUND OF THE INVENTION

In the case of the Alicantina shutters and the like, the lifting of which is carried out by winding thereof from the lower edge of the shutter upwards, for which the shutter is fastened by the upper edge thereof to a suitable profile or anchor, while a winding tape or cord is attached to the upper edge of the shutter, the tape or cord running downwards and wrapping around the shutter, after folding upwards again, after surpassing the lower edge of the shutter, such that said tape is passed over a hole or pulley so that the shutter is wound upwards from the lower edge of the shutter by pulling the free end of said tape or cord.

To unfold or lower the shutter, it is sufficient to release the tension on the end of the cord or tape, so that the weight of the same shutter causes it to unwind, as long as the cord does not offer any resistance after its release from the pulling end thereof. FIG. 1 shows an Alicantina shutter or the like fully unfolded or lowered.

To fold or raise the shutter, the cord or tape must be pulled, which causes the upward thrust of the shutter and the winding thereof from its lower edge or end.

However, the pulling of the cord may cause that the vertical movement of the shutter cannot adapt to the winding speed, so that the shutter, instead of winding, curves by the unwound segment thereof, preventing its winding. This problem is shown in FIG. 2.

Utility model U201500561 describes a system that solves the technical problem described above, for which the incorporation of an elastic element (spring, elastic cord, bellows) in said model has been provided, which causes the unwound segment of the shutter to always remain vertical, preventing the same from curving. For this purpose, each time the shutter is slightly raised, the elastic element yields by stretching due to the weight of the partially wound shutter, so that the unwound segment of the shutter remains stretched during the process of raising the shutter.

The elastic element, described in said utility model, is located at the end of the rope or cord that is attached to the head of the shutter, while the other end of the cord is that which is pulled to raise the shutter.

Well, the elastic element of this utility model U201500561 presents the drawback of eventually failing to retract and return to the rest position thereof during the process of lowering the shutter. In these circumstances, when the shutter is partially unwound or lowered the elastic element is stretched and in certain circumstances the same cannot be stretched any further and thus prevent the unwound segment of the shutter from curving during the process of raising the shutter.

During the process of lowering the shutter, the elastic element does not manage to retract and return to its rest position because the tension of the elastic element is not released until the shutter has completely reached the bottom, mainly due to the friction of the cord with the slats.

When the shutter is completely at the bottom, the cord ceases to have friction, and the elastic device can recover its initial length, since the tension in the cord has been released, due to the fact that all the slats have unwound.

It would be interesting to have a device for winding and unwinding Alicantina shutters and the like that would allow the elastic element to retract and return to its rest position during the process of unwinding or lowering the shutter.

There are drums on the market for winding cords onto them in the longitudinal direction thereof. Most of these drums are used for the curtain lifting system using a cord and are characterised in that the lifting of the fabric is carried out by means of yarns that are wound on the drum. These yarns lift the fabrics by winding on a drum on which the entering yarn moves the already wound turns by the same pressure exerted by the entering yarn on the turns. The drum is usually made of a very slippery material, and the combination of this technique plus the low friction exerted by the drum material allows the system to work.

This does not happen with the cords used in Alicantina shutters or the like, which are thicker and present more friction. The cord used in Alicantina shutters or the like tends to be mounted on the cord that forms the last turn that has been wound, which makes it necessary to use an auxiliary element to cause the coil of turns already wound to run and leave a free space for the entering cord.

DESCRIPTION OF THE INVENTION

The recommended device solves the above-mentioned problem in a fully satisfactory manner, for which the inclusion of at least two actuation cords for raising and lowering the Alicantina shutter or the like has been provided, which are associated to the corresponding at least two elastic elements, for example embodied in a pair of springs.

The inclusion of at least two cords, with their corresponding elastic elements associated thereto, means that, when the shutter begins to lower and due to a lack of absolute horizontality, one cord has more tension than the other so that the elastic element of the opposite cord can recover, an alternative effect of recovery of the elastic elements of one and the other cord being produced, so that said elements loosen during the lowering of the shutter, although the shutter is not completely lowered. This technical effect cannot be achieved with a single cord associated with an elastic element.

By means of the device object of the invention, the recovery capacity of the elastic elements during the lowering of the shutter is increased, even if the shutter has not released the tension of the cords.

In the event that the shutter is motorised, it has been provided that the cords are wound onto a drum that is attached to the axis of rotation of the system with the particularity that said drum rotates on a ring attached to the same head of the shutter, said ring presenting a hole for the passage of the cord that has to be wound onto the drum, with the particularity that said ring includes a ramp laterally so that the first turn of cord that enters onto the drum moves along the same ramp, leaving a free space, without cord, so that the entering cord does not mount on the one already wound on the drum and moves progressively towards the end opposite to all the turns of cord that are wound on the drum, the opposite end of said cord being attached to the corresponding end of the drum, so that from an initial conical segment for said drum, it runs straight, so that the turns remain perfectly in the plane perpendicular to the axis of rotation of the drum for winding the cord for raising and lowering the same shutter, turns which have no tension, since their diameter is larger than the diameter of the straight cylindrical portion or segment of the drum, due to the fact that when they have wound they have done so at the beginning of the conical portion with a larger diameter than the straight cylindrical segment, so that the turns do not offer resistance when being thrust by the entering turn.

To say that the drum will have a length greater than that of the same ring through which it passes, protruding through the conical portion of said drum with respect thereto, so that the entering turn of cord passes directly into the conical portion of the drum and is forced to wind longitudinally onto the drum, in the direction opposite to that of the ring, with the particularity that the entering cord would also be forced to enter through the conical portion of the drum by means of any mechanical element, such as for example a guide hole that could be located in the same ring or any other system, taking into account that the drum cannot move in longitudinal direction with respect to the ring in order to keep the conical portion always facing the ramp of the ring, for which said drum has been provided to be attached directly to the axis of rotation.

BRIEF DESCRIPTION OF THE DRAWINGS

As a complement to the description that will be provided herein, and for the purpose of helping to make the features of the invention more readily understandable, according to a preferred practical exemplary embodiment thereof, said description is accompanied by a set of drawings constituting an integral part thereof in which, by way of illustration and not limitation, the following is represented:

FIGS. 4, 5, 6, and 7 show respective schematic details of the manner in which the cords and the corresponding elastic elements thereof are linked, such that FIG. 4 represents the raised or semi-raised shutter, FIG. 5 corresponds to the shutter in the initial lowering phase, FIG. 6 representing the tensioning and balancing of the two elastic elements, while FIG. 7 shows the lowering of the cord opposite to that which is shown in FIG. 5.

PREFERRED EMBODIMENT OF THE INVENTION

Figure 1:
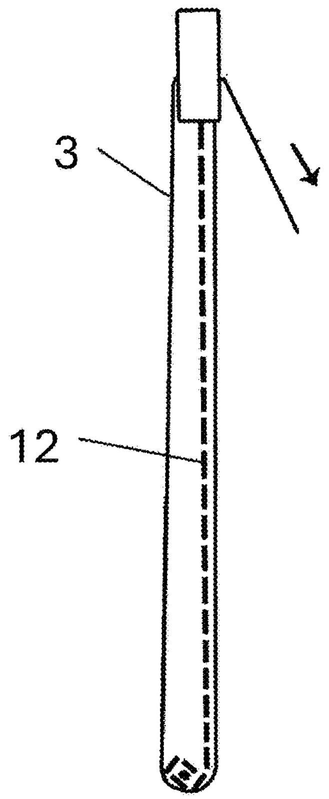
FIG. 1 PRIOR ART
FIG. 1 shows a representation corresponding to a schematic profile view of a shutter with the conventional winding system, in inoperative or at rest status.
Figure 2:
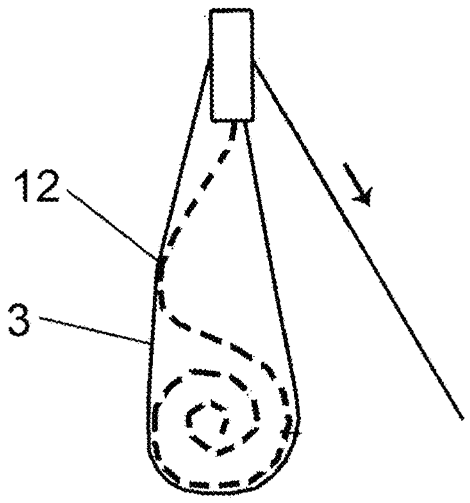
FIG. 2 PRIOR ART
FIG. 2 shows a view of the set of the preceding figure before a pulling of the actuation cord of the same, being possible to see how a curvature is formed that prevents the correct winding of the shutter.

As can be seen in the figures referred to, with specific reference to FIGS. 1 and 2, in an Alicantina shutter or the like (12), the winding of which is carried out by means of a pulling cord (3), which at one end is attached to an upper anchorage, while at the other end it passes over a pulley located at the upper portion, embracing the shutter assembly (12), to define a free segment through which the pulling is carried out.

Well, FIG. 2 shows the manner in which the unwound portion of the shutter (12), during the process of winding or raising the shutter, suffers a curvature that prevents the correct winding thereof.

Figure 3:
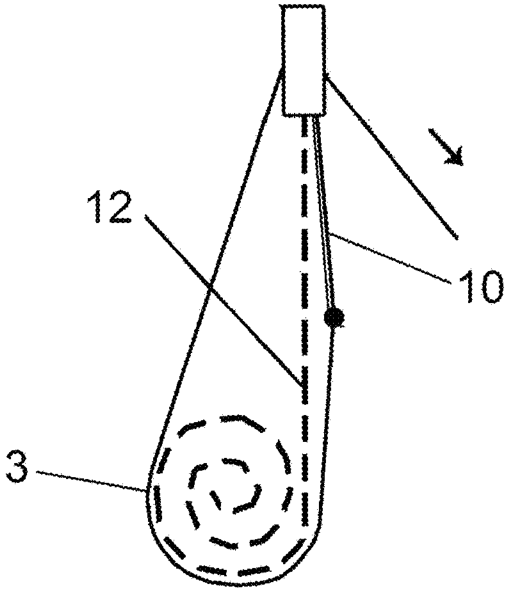
FIG. 3 PRIOR ART
FIG. 3 shows a view as in the preceding figures but with the cord associated to an elastic element, in use status, showing how the shutter manages to wind correctly by keeping the unwound shutter segment stretched.

From this structure, and according to FIG. 3, a solution to the problem of poor winding of the shutter (12) is shown, consisting in the fact that the shutter (12), mounted suspended from an anchoring element, as is conventional, and wrapped by the corresponding pulling cord (3), presents the particularity that between the upper anchoring point and the end of the cord (3) an elastic element (10) is inserted, which allows to keep the unwound segment of the shutter stretched, thus avoiding the formation of a curvature that prevents the correct winding thereof.

In view of FIGS. 4-7, it can be seen how the device of the invention comprises at least two cords (3-3') associated with the respective elastic elements, in this case made up of two springs (10-10').

Figure 4:
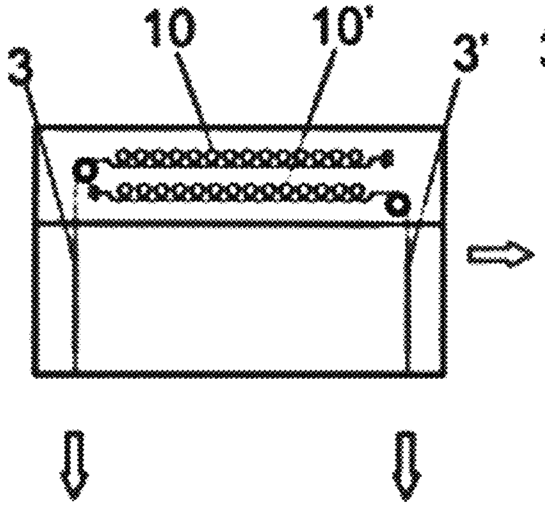

FIG. 4 schematically shows the shutter partially or fully wound or raised, the springs (10-10') being tensioned.

Figure 5:
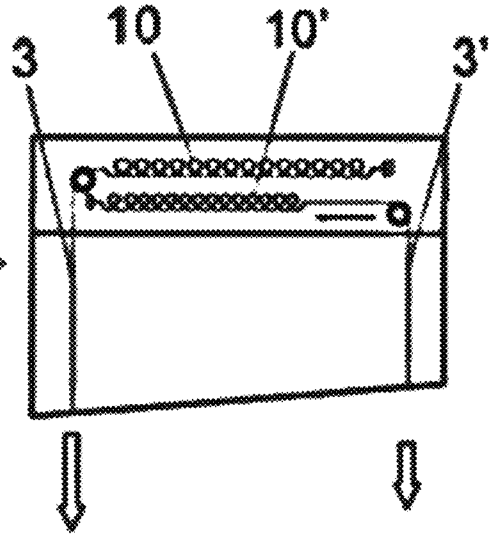

FIG. 5 shows the shutter as it begins to lower. Due to the lack of total horizontality, and thanks to the fact that there are at least two cords (3-3'), one of the cords will support more weight than the other, which will cause the elastic element associated with the cord with less tension to retract and return to its rest position at least partially. FIG. 5 shows that the cord (3) has more tension than the cord (3') so that the spring (10') will recover.

Figure 6:
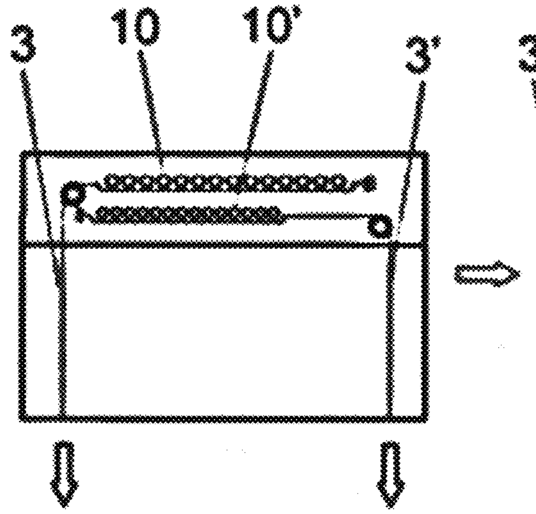

FIG. 6 shows the manner in which the shutter has continued to lower after the position in FIG. 5. At this point, the cord (3'), due to the recovery of the elastic element (10'), has less tension, a situation that causes the shutter to tend to lower by the end of the cord (3')-elastic element (10') assembly until it reaches a higher tension than the cord (3)-elastic element (10) assembly (FIG. 7), wherein the method will be repeated, which, during the entire lowering manoeuvre, will become alternative.

Figure 7:
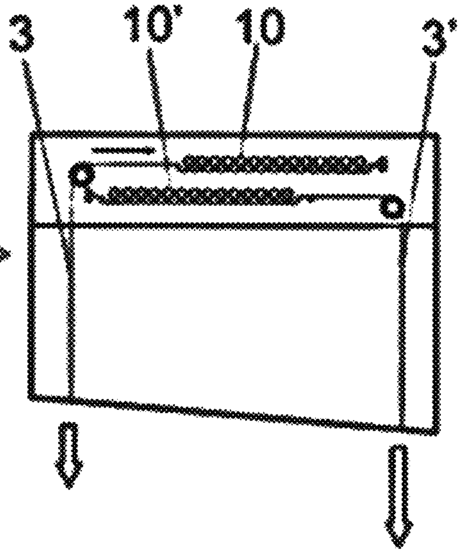

FIG. 7 shows the shutter at a later time than that which is shown in FIG. 6. Due to the retraction of the element associated with the cord that supported less tension, the shutter is now unbalanced in the opposite direction. Again, due to the lack of total horizontality, and thanks to the fact that there are at least two cords (3-3'), one of the cords will have more tension than the other which will cause the elastic element associated to the cord with less tension to retract (stop stretching) and at least partially return to its rest position. FIG. 7 shows that the cord (3) has more tension than the cord (3') so that the spring (10') will recover.

In this way, the elastic elements (10 and 10') of the ropes or cords (3-3') will be loosened during the lowering of the shutter, even if the shutter is not completely lowered.

This effect is not achieved with a device with a single rope because this difference in tension does not occur and the elastic element will always be tensioned by the weight of the shutter and therefore the shutter will need to be fully lowered in order to release the tension in the cord and allow the elastic element to fully loosen. Otherwise, i.e. if the shutter is not fully lowered, the elastic element will be as stretched as it was stretched during the raising of the shutter in the preceding operation, so that when the shutter is raised again the spring will be stretched even more, causing the elastic element to be stretched completely or at a tension higher than that required to prevent the formation of a curve in the segment of the shutter that is not wound yet.

In the event that the Alicantina shutter (12) or the like is motorised, the device for unwinding cords for raising/lowering shutters (12) comprises a head (1), a ring (7) attached to the head (1), and a drum (2) rotating within the ring (7) for winding or unwinding a cord (3). At one end (4) the cord (3) is attached to the same drum (2) and at the opposite end is passed through a hole (5) to allow the actuation thereof during unwinding onto the drum (2).

The ring (7) comprises a ramp (8) laterally which moves the first turn (3A) of cord (3) entering onto the drum (2) so that, the length of movement of the first turn (3A) will be the same or greater than the diameter of the same cord (3) to ensure that the last turn that has been wound does not hinder the cord entering the drum.

Figure 9:
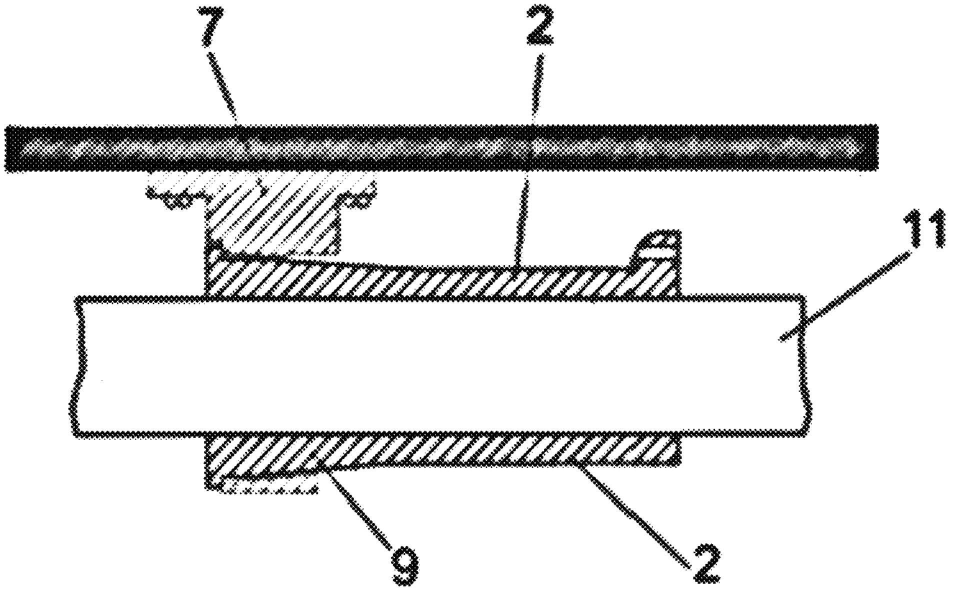
FIG. 9 shows a longitudinal cross-sectional view of the assembly of the preceding figure.
Figure 10:
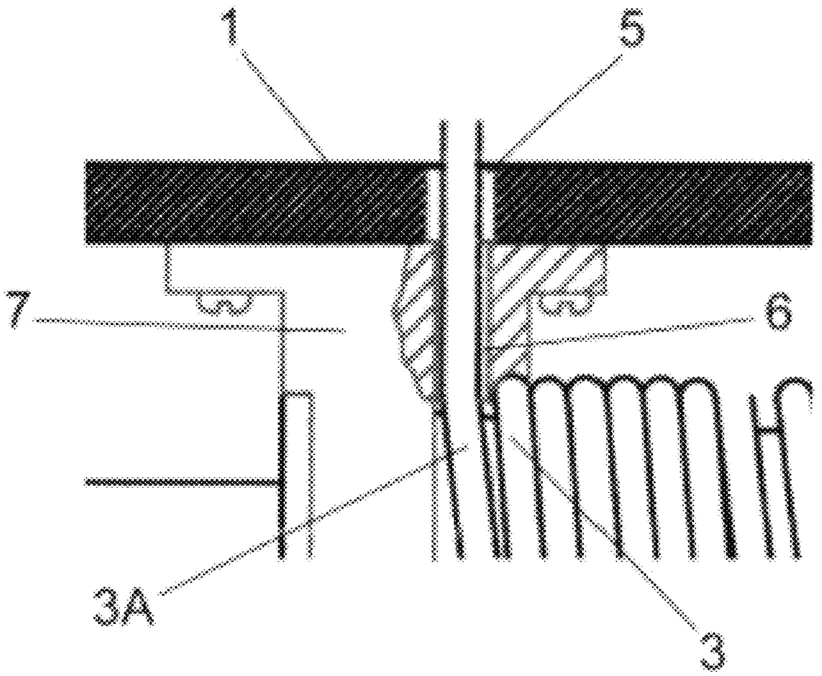
FIG. 10 shows a detail of the manner in which the cord is passed through the ring for winding thereof onto the drum.

The drum (2) presents a conical segment (9) downstream of which the same drum is straight as represented in FIG. 9, with the particularity that the inside of the ring (7) in which the drum (2) angularly moves preferably presents a complementary taper to be suited to said conical segment (9).

According to the referred features, the device of the invention allows to improve the winding of the cord (3) entering through the hole of the head (5) and the hole of the ring (6) on a drum (2). By means of the ramp (8) of the ring (7) the first turn (3A) is moved along the axis of rotation (11), solidly attached to the same drum (2) as shown in FIG. 9, such that the length of movement of the first turn (3A) will be the same or greater than the diameter of the same cord (3) to ensure that the last turn that has been wound does not hinder the cord entering the drum.

Figure 8:
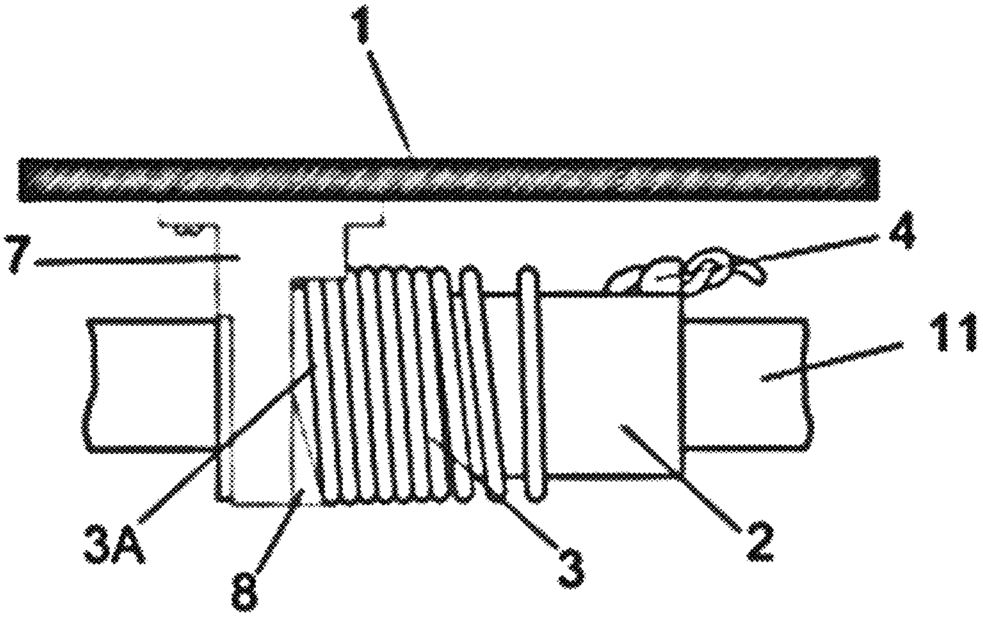
FIG. 8 shows a schematic view of the manner in which the drum for winding the cord is mounted with respect to the ring attached to the head of the shutter and wherein a device is involved for unwinding cords for raising/lowering shutters made in accordance with the present invention.

The movement of the first turn (3A) causes the movement of the same wound turns on the drum (2), as shown in FIG. 8. The movement of the turns along the drum is carried out without too much opposition because part of them are positioned on the straight segment of the drum (2), of smaller diameter than the diameter of the first turn (3A) that enters on the conical segment of the drum (2).

As has already been said throughout the present specification, preferably the difference in size between the end diameter of the conical portion (9) of the drum (2) through which the cord (3) enters and the diameter of the straight or cylindrical portion of said drum is approximately equal to the diameter of the cord (3), thus ensuring that said cord wound on the straight portion is perfectly suited preventing some turns from mounting on others.

The invention claimed is:

1. An Alicantina shutter assembly comprising:

a head profile;

a shutter having a lower edge and an upper edge, the upper edge fastened to said head profile; and a device for winding and unwinding said shutter upwards from the lower edge of the shutter to said head profile, the device for winding and unwinding said shutter comprising:

a first elastic element attached at a first end thereof to said head profile and at a second end thereof to a first end of a first cord, a second end of the first cord attached near the lower edge of said shutter, and the first cord passing through a first hole in said head profile or over a first pulley attached to said head profile; and a second elastic element attached at a first end thereof to said head profile and at a second end thereof to a first end of a second cord, a second end of the second cord attached near the lower edge of said shutter, and the second cord passing through a second hole in said head profile or over a second pulley attached to said head profile, wherein the second cord is separate and distinct from the first cord; and wherein said first elastic element and said second elastic element are in parallel, and said first elastic element and said second elastic element are in opposing and alternating extension and retraction as said shutter is unwound and said lower edge deviates from total horizontality with respect to said upper edge, and where a downward incline of said lower edge alternates between from said first cord to said second cord and from said second cord to said first cord.

2. The Alicantina shutter assembly of claim 1, wherein said first elastic element and said second elastic element are both springs.

* * * * *